I. G. WOODY.
COMBINED STEERING WHEEL AND INDICATOR.
APPLICATION FILED NOV. 13, 1917.

1,273,440.

Patented July 23, 1918.

Inventor
Isabel G. Woody
By his Attorney
C. D. Haskins

UNITED STATES PATENT OFFICE.

ISABEL G. WOODY, OF SEATTLE, WASHINGTON.

COMBINED STEERING-WHEEL AND INDICATOR.

1,273,440.

Specification of Letters Patent.

Patented July 23, 1918.

Application filed November 13, 1917. Serial No. 201,885.

*To all whom it may concern:*

Be it known that I, ISABEL G. WOODY, citizen of the United States, residing at Seattle, in the county of King and State of Washington, have invented a certain new and useful Improvement in Combined Steering-Wheels and Indicators, of which the following is a specification.

My invention relates to improvements in combined steering wheel and direction indicator, and the object of my invention is to provide a steering wheel for an automobile, which steering wheel shall be provided with a distinctive direction indicator, which shall be fastened to the rim of said steering wheel in a position to be observable at all times by the operator of said wheel and in which portion said direction indicator shall always be intersected by the line radiating from the axis of said steering wheel toward the course over which the automobile is traveling in response to a manipulation of said steering wheel.

A further object of my invention is to provide a steering wheel combined with a direction indicator, which direction indicator shall be provided with a roughened surface which the operator may conveniently use as a frictional surface for the purpose of igniting a match thereon, as he may desire to do at different times, without interfering with his work of steering the automobile.

I accomplish these objects by devices illustrated in the accompanying drawings, wherein—

Figure 1:
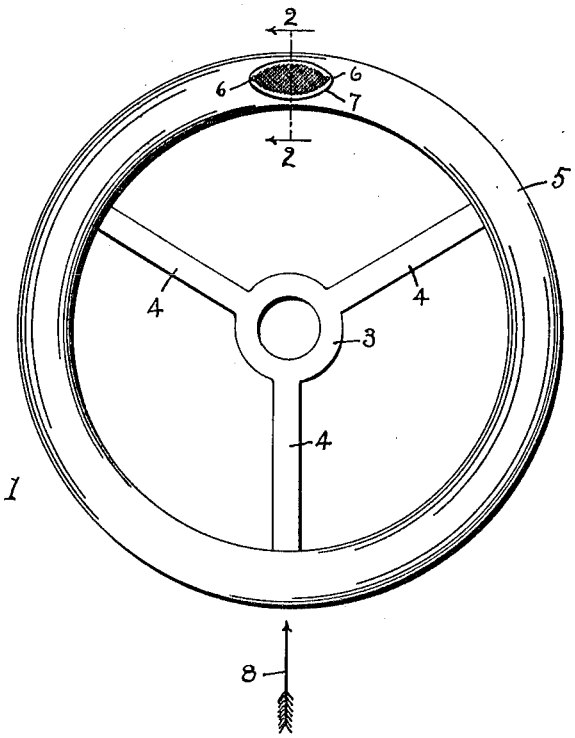
Figure 2:
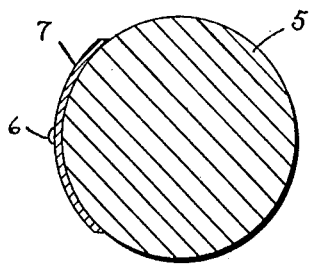

Figure 1 is a plan view of a combined steering wheel and direction indicator embodying my invention; and Fig. 2 is an enlarged view of the same in radial section on broken line 2, 2 of Fig. 1.

Referring to the drawings, throughout which like reference numerals indicate like parts, 3 designates the hub of a steering wheel of an automobile from which hub 3 extend three integral spokes 4, to the outer end portions of which spokes 4 is fastened a wheel rim 5 of circular cross-section.

Fastened by pins 6 to the top side surface of the rim 5 is an oval indicator plate 7 which is curved in form to correspond to the contour of said top side surface as indicated in Fig. 2.

The outer surface of the indicator plate 7 is provided with numerous intersecting V-shaped grooves which form a roughened surface that may facilitate the operation of igniting a friction match.

The hub 3 is to be fastened to the upwardly projecting end portion of the steering shaft of an automobile (not shown) in such position thereon that the center of the indicator plate 7 shall be in a line that extends from the axis of said hub 3 directly forward in a straight course when the front wheels of the automobile are in a position to cause the automobile to travel forward in said straight course which is indicated by the arrow 8 in Fig. 1.

The hub 3 is to be fastened to the upwardly projecting end portion of the steering shaft of an automobile, not shown, in such circumferential positions thereon that when the front wheels of the automobile are disposed to cause the automobile to travel in the course of a straight line that radiates from the axis of said steering shaft then said straight line shall register with the center of the indicator plate 7, and when the steering wheel is turned to cause the automobile to change its course from said straight line to travel in a curved path then the indicator plate 7 will be moved to a position that will be in the line radiating from the axis of said steering shaft toward the line of travel over said curved path thus to indicate the direction of said line of travel.

The roughened surface of the indicator plate 7 at desired times may be used by the operator of the automobile in operation of lighting a friction match with one hand in an obvious manner while his other hand is manipulating the steering wheel.

What I claim is:

The combination with the steering wheel of an automobile, of an indicator plate having a roughened surface and fastened to the top surface of the rim of said steering wheel in a position thereon to intersect a line radiating from the axis of said steering wheel in a direction toward the course over which said automobile is steered in response to a manipulation of said steering wheel.

In witness whereof I hereunto subscribe my name this 7th day of November, A. D. 1917.

ISABEL G. WOODY.

Copies of this patent may be obtained for five cents each, by addressing the "Commissioner of Patents, Washington, D. C."